(12) United States Patent
Claudel et al.

(10) Patent No.: US 12,536,915 B2
(45) Date of Patent: Jan. 27, 2026

(54) METHOD AND SYSTEM FOR ASSISTING THE AVOIDANCE OF AN EXCURSION BY AN AIRCRAFT FROM A RUNWAY OR TAXIWAY OF AN AERODROME

(71) Applicant: Airbus Operations SAS, Toulouse (FR)

(72) Inventors: Emilie Claudel, Toulouse (FR); Isabelle Sentissi, Toulouse (FR); Louise Faure, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 30 days.

(21) Appl. No.: 18/534,947

(22) Filed: Dec. 11, 2023

(65) Prior Publication Data

US 2024/0203272 A1 Jun. 20, 2024

(30) Foreign Application Priority Data

Dec. 16, 2022 (FR) ....................................... 2213617

(51) Int. Cl.
*G08G 5/51* (2025.01)
*G01S 13/934* (2020.01)
(Continued)

(52) U.S. Cl.
CPC .............. *G08G 5/51* (2025.01); *G01S 13/934* (2020.01); *G06V 10/70* (2022.01); *G06V 20/17* (2022.01);
(Continued)

(58) Field of Classification Search
CPC .. G08G 5/51; G08G 5/21; G08G 5/80; G08G 5/56; G08G 5/727; G01S 13/934; G06V 10/70; G06V 20/17; G06V 20/56
See application file for complete search history.

(56) References Cited

U.S. PATENT DOCUMENTS 3,678,256 A 7/1972 Harenberg, Jr.
5,845,874 A * 12/1998 Beasley ................ G08G 5/727
73/147

(Continued)

FOREIGN PATENT DOCUMENTS

EP 2892041 A1 7/2015
EP 2952927 A1 12/2015
(Continued)

OTHER PUBLICATIONS

French Search Report for Application No. FR 2213611 completed Jun. 27, 2023. 2 pgs.

(Continued)

*Primary Examiner* — Behrang Badii
(74) *Attorney, Agent, or Firm* — Lerner David LLP

(57) ABSTRACT

The system for assisting the avoidance of an excursion by an aircraft from a runway or taxiway of an aerodrome includes a unit for monitoring the aerodrome so as to allow the detection, by optical detection, of a characteristic element of a pathway, for determining a current relative position of a landing gear of the aircraft (AC) with respect to the detected characteristic element, and for detecting a future excursion from the pathway of the aerodrome by the aircraft (AC) on the basis of at least this current relative position, and a unit for assisting the implementation of an action for assisting the avoidance of said future excursion. The system is configured for providing assistance to the pilot of the aircraft by improving his awareness of a potential excursion, by warning and/or ground navigation aid messages, and by providing protection of last resort via automatic braking.

13 Claims, 4 Drawing Sheets

(51) Int. Cl.
  *G06V 10/70* (2022.01)
  *G06V 20/17* (2022.01)
  *G06V 20/56* (2022.01)
  *G08G 5/21* (2025.01)
  *G08G 5/80* (2025.01)
(52) U.S. Cl.
  CPC .............. *G06V 20/56* (2022.01); *G08G 5/21* (2025.01); *G08G 5/80* (2025.01)

(56) References Cited

U.S. PATENT DOCUMENTS

| | | | |
|---|---|---|---|
| 9,384,586 | B1 * | 7/2016 | McCusker ............... G08G 5/80 |
| 10,228,460 | B1 | 3/2019 | Jinkins et al. |
| 2009/0150008 | A1 | 6/2009 | Villaume et al. |
| 2014/0136091 | A1 | 5/2014 | Perrie et al. |
| 2014/0278037 | A1 | 9/2014 | Choksi et al. |
| 2014/0283728 | A1 * | 9/2014 | Wang ...................... B63B 35/50 114/261 |
| 2019/0122572 | A1 * | 4/2019 | Morellec ................. G08G 5/51 |
| 2020/0027362 | A1 | 1/2020 | Dame et al. |
| 2020/0290750 | A1 | 9/2020 | Ferrell et al. |
| 2021/0350715 | A1 | 11/2021 | Liu et al. |
| 2022/0189316 | A1 * | 6/2022 | Paul ......................... G08G 5/30 |

FOREIGN PATENT DOCUMENTS

| | | | |
|---|---|---|---|
| EP | 3109845 | A1 | 12/2016 |
| EP | 3598418 | A1 | 1/2020 |
| WO | 2022170401 | A1 | 8/2022 |
| WO | 2024056972 | A1 | 3/2024 |

OTHER PUBLICATIONS

French Search Report for Application No. FR 2213613 completed Jun. 28, 2023. 2 pgs.
French Search Report for Application No. FR 2213617 compeleted Jun. 29, 2023, 2 pgs.
French Search Report for Application No. FR 2213621 compeleted Jun. 30, 2023, 2 pgs.
Mere, Co-pending U.S. Appl. No. 18/534,966, filed Dec. 11, 2023, titled "Method And System For Assisting A Pilot Of An Aircraft When The Aircraft Is Taxiing On A Traffic Lane Of An Airport".
Claudel, Co-pending U.S. Appl. No. 18/535,117, filed Dec. 11, 2023, titled "Method And System For Assisting The Avoidance Of A Collision With An Obstacle For An Aircraft Taxiing On An Aerodrome".
Claudel, Co-pending U.S. Appl. No. 18/535,224, filed Dec. 11, 2023, titled "Method And System For Assisting In The Avoidance Of An Incursion Onto A Runway By An Aircraft Taxiing On An Airfield".
Anonymous : « Visual odometry—Wikipedia », Dec. 1, 2019 (Dec. 1, 2019), pp. 1-5, XP093135212.
European Search Report for Application No. 23214111 completed Feb. 27, 2024. 9 pgs.
Amielh, Capucine, "GNSS Multi path Model for Aircraft Surface Navigation," May 2021, Institut National Polytechnique de Toulouse, pp. 37-38.

* cited by examiner

METHOD AND SYSTEM FOR ASSISTING THE AVOIDANCE OF AN EXCURSION BY AN AIRCRAFT FROM A RUNWAY OR TAXIWAY OF AN AERODROME

FIELD OF THE INVENTION

The present invention relates to a method and a system for assisting the avoidance of an excursion (longitudinal or lateral) from a pathway of an aerodrome by an aircraft taxiing on this pathway.

In the context of the present invention,

"pathway of the aerodrome" is taken to mean a runway (for the landing and/or takeoff of aircraft) or another taxiway of the aerodrome that is notably used by aircraft for travel between a runway and a parking stand, and "excursion from a pathway of the aerodrome", for an aircraft such as a transport aircraft taxiing on the pathway, is taken to mean a situation where its trajectory approaches an edge line too closely, or in other words departs too far from a center line (or central axis), as specified below.

BACKGROUND OF THE INVENTION

Such an excursion would not only be dangerous in general for the taxiing of the aircraft, but would also expose the aircraft to risks of collision, notably with other aircraft, vehicles, ground equipment or airport infrastructure, and/or could cause damage to the aircraft and/or interference with the operation being performed by the aircraft.

BRIEF SUMMARY OF THE INVENTION

Thus it could be helpful to provide a solution for assisting an aircraft pilot to prevent the occurrence of such an excursion from a pathway.

One aspect of the present invention may provide such a solution. For this purpose, an aspect of the present invention relates to a method for assisting the avoidance of an excursion (longitudinal or lateral) from a pathway of an aerodrome by an aircraft taxiing on the pathway.

According to an aspect of the invention, the method comprises at least the following steps:

a monitoring step, implemented by a monitoring unit, at least for monitoring the aerodrome so as to be able to detect, preferably by optical detection, for example visual detection, at least one characteristic element of a pathway, in order to determine a current relative position of at least one landing gear of the aircraft with respect to the characteristic element detected, and to detect a future excursion from said pathway of the aerodrome by the aircraft on the basis, at least, of this current relative position and parameters (notably the speed) of the aircraft; and a step of assisting avoidance, implemented by at least one avoidance aid unit, so that, at least, if a future excursion is detected in the monitoring step, at least one action for assisting the avoidance (or prevention) of said future excursion is implemented.

The method is implemented during a taxiing phase and/or during a parking phase, as specified below.

Thus, said method is capable, during the taxiing and/or parking phase, on the one hand, of detecting (by optical detection) a future excursion (longitudinal or lateral), that is to say a potential excursion, from a pathway of an aerodrome by the aircraft in which said method is implemented, and, on the other hand, providing assistance to the aircraft pilot to avoid the excursion in such a situation, particularly, as specified below, by improving the pilot's awareness of the actual situation (using warning messages or ground navigation aid messages) and/or by providing protection of last resort (by implementing the automatic braking of the aircraft).

Aspects of the present invention may thus be applied to both a taxiing and a parking phase. More precisely, during a taxiing phase of the aircraft, an excursion is an excessively close approach to an edge line, or even a departure from the surfaced area on which it is taxiing, as a result of either a lateral deviation (lateral excursion) or overrunning of the area (longitudinal excursion); and/or during a parking phase of the aircraft, an excursion is an excessive departure from a center line (or central axis) or from a stop marking which is a customary ground marking at which an element of the aircraft, for example its front landing gear, must be positioned when the aircraft is in the parked position.

In the context of the present invention, "optical detection" is taken to mean detection, implemented by optoelectronic means and sensors, consisting in the forming of images by the capture of electromagnetic radiation, for example infrared or visible radiation. Preferably, the optical detection is what is known as visual detection, for which visible radiation is detected.

Advantageously, the monitoring step implements optical detection and comprises, for the implementation of the optical detection:

a sub-step of capturing images, implemented by an imaging device, for capturing images (in the visible or infrared spectra, for example) from the external environment of the aircraft;

a sub-step of processing at least some of the images captured in said image capture sub-step, so as to detect a characteristic element of a pathway when the characteristic element is represented on one of the processed images.

Advantageously, the image processing sub-step uses at least one of the following techniques:

a technique using artificial intelligence;

an image processing technique.

In one embodiment, the monitoring step comprises a data processing sub-step, implemented to determine the current relative position between a characteristic element, the representation of which has been detected in the image, and the aircraft's landing gear, with allowance for the characteristics (position, orientation, calibration) of the imaging device used in the image capture sub-step.

Additionally, said characteristic element or elements preferably comprise at least one limit between an area surfaced for traffic on a pathway and an area not surfaced for traffic.

In a preferred embodiment, the monitoring step uses radar to detect the boundary between the area surfaced for traffic on the pathway and the area not surfaced for traffic.

In another embodiment, the monitoring step implements optical detection and radar detection simultaneously.

Also, advantageously, the monitoring step determines what is known as an absolute position of the aircraft, using information from at least one of the following elements of the aircraft: an inertial reference system, a satellite positioning system, an odometer, a tachometer, and an optoelectronic sensor.

Also, advantageously, said characteristic element or elements comprise at least one of the following elements:
- a center line of a pathway;
- an edge line of a pathway;
- a stop marking.

In a particular embodiment, the monitoring step determines a consolidated current relative position of a landing gear of the aircraft, using at least two position information elements (relative position(s) and/or absolute position(s)).

Also, advantageously, the monitoring step comprises a data processing step, implemented at least for the purpose of determining at least one (current) warning envelope, depending on at least one relative position of a landing gear of the aircraft and on parameters of the aircraft, and for the purpose of detecting an excursion from a pathway if the (current) warning envelope touches one side of the pathway.

Advantageously, the data processing step determines, for each of the landing gears of the aircraft, a plurality of different (current) warning envelopes, each of which depends on a duration called the particular excursion duration.

Additionally, advantageously, the avoidance assistance step is implemented at least for the purpose of emitting (to the flight deck of the aircraft) at least one of the following messages: a warning message and a ground navigation aid message, said message being emitted in at least one of the following forms: visual and audible.

Furthermore, advantageously, the avoidance assistance step is implemented for the purpose of automatically generating the braking of the aircraft if the pilot takes no appropriate action after at least one message has been sent.

The present invention also relates to a system for assisting the avoidance of an excursion (longitudinal or lateral) from a pathway of an aerodrome by an aircraft taxiing on the pathway.

According to the invention, said system (designed to be mounted on an aircraft) comprises at least:
- a monitoring unit, configured for monitoring the aerodrome so as to be able to detect, by means of optical detection, at least one characteristic element of a given pathway, in order to determine a current relative position of at least one landing gear of the aircraft with respect to the characteristic element detected, and to detect a future excursion from said pathway of the aerodrome by the aircraft on the basis, at least, of this current relative position and parameters of the aircraft; and
- at least one avoidance assistance unit, configured for implementing at least one action for assisting the avoidance (or prevention) of said future excursion if a future excursion is detected by the monitoring unit.

The present invention also relates to an aircraft, particularly a transport aircraft, which comprises at least one system for assisting the avoidance of an excursion from a pathway, such as that described above.

BRIEF DESCRIPTION OF THE DRAWINGS

The figures of the attached drawing will clearly show how the invention can be applied. In these figures, identical references denote similar elements.

DETAILED DESCRIPTION

Figure 1:
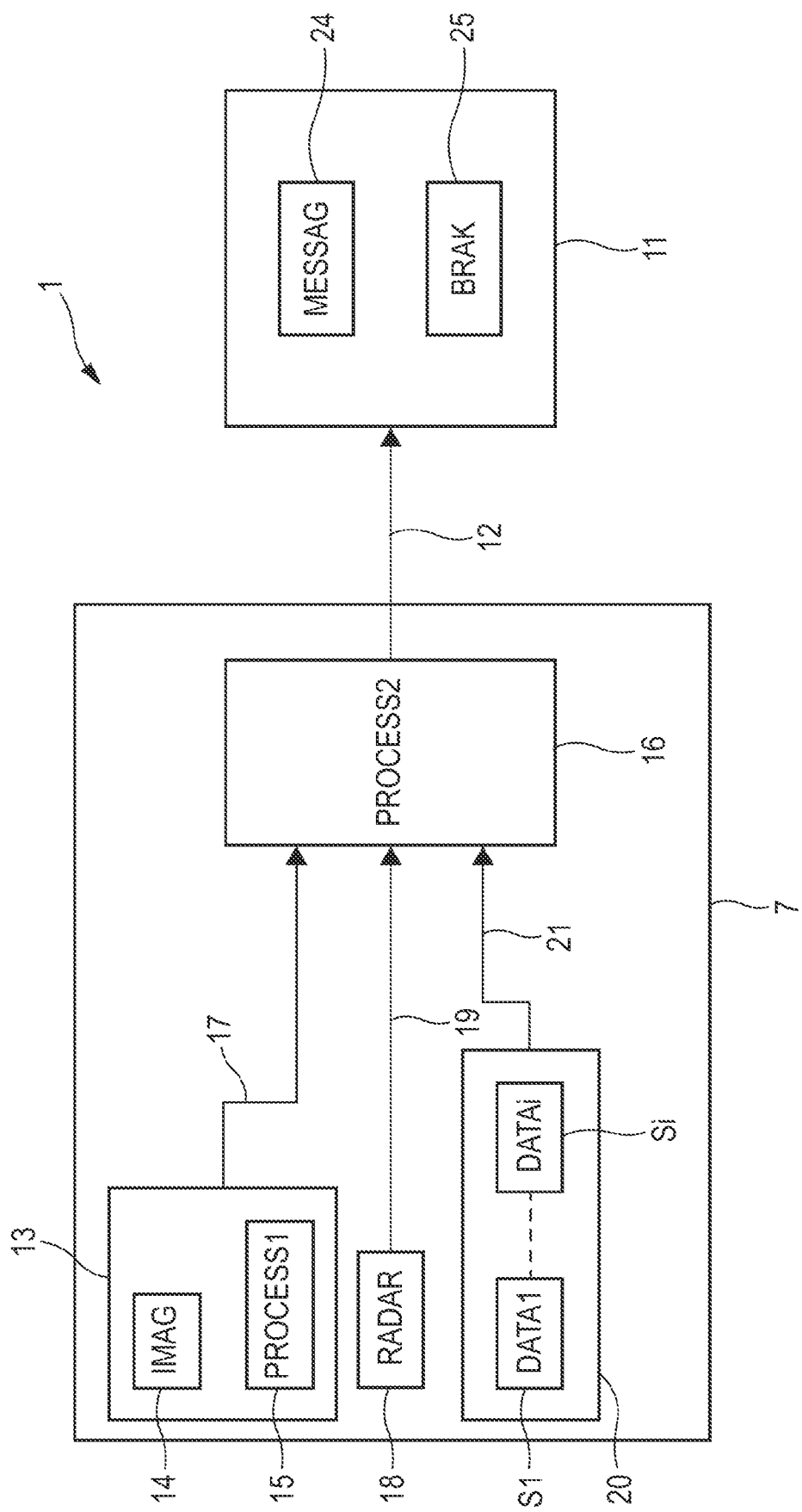
FIG. 1 is a synoptic diagram of a system for assisting the avoidance of an excursion from a pathway, according to a particular embodiment of the invention.

The system 1, shown schematically in FIG. 1 and providing an illustration of the invention, is designed to be fitted to an aircraft AC, particularly a transport aircraft.

Figure 2:
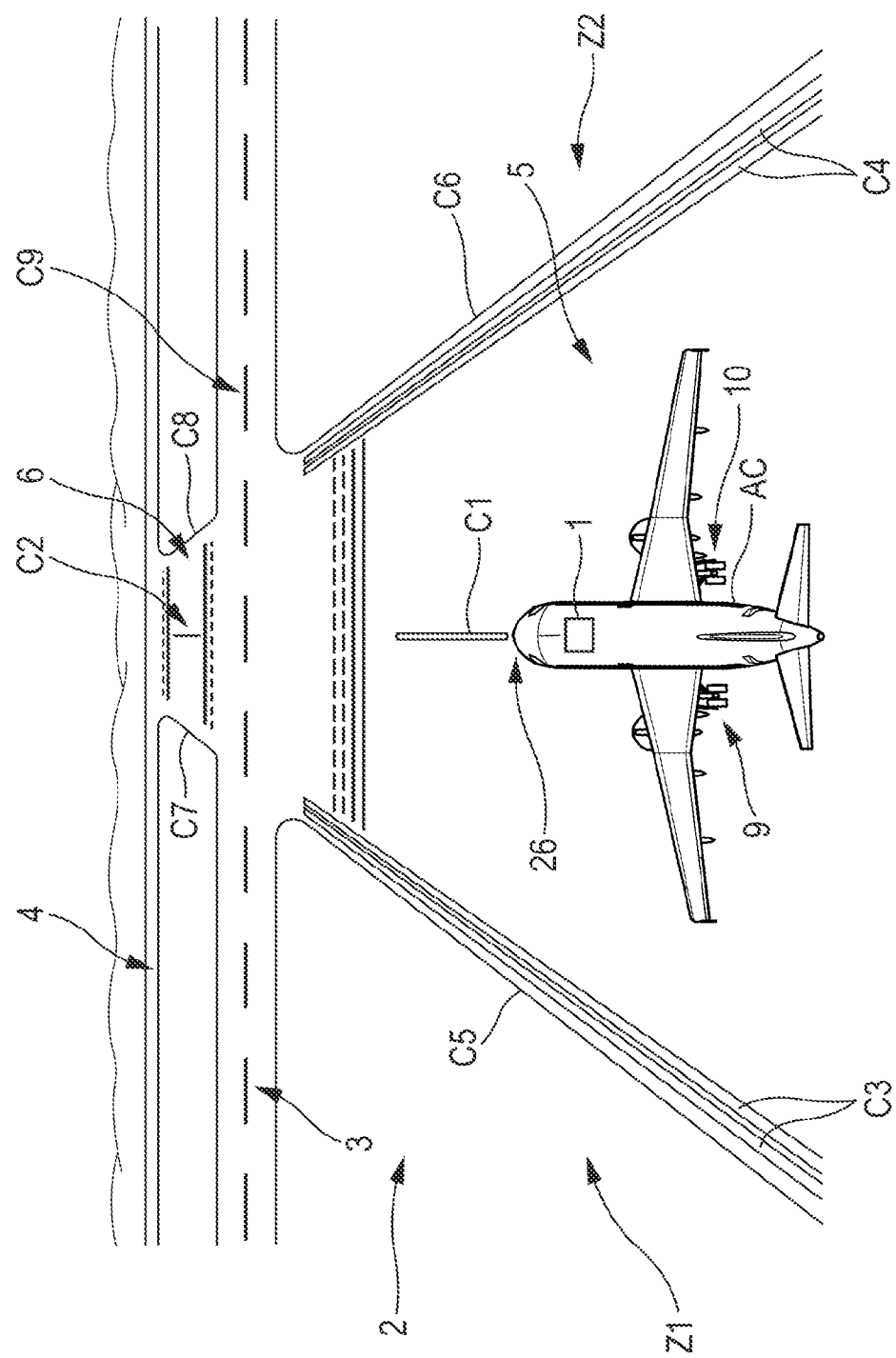
FIG. 2 is a schematic view, in perspective, of part of an aerodrome on which an aircraft travels in a taxiing phase, the aircraft being equipped with a system for assisting the avoidance of an excursion from a pathway.
Figure 4:
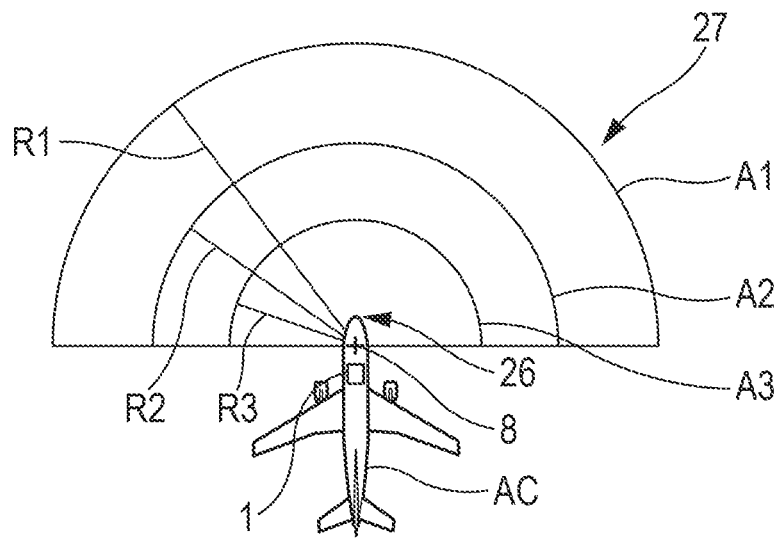
FIG. 4 is a schematic view of an aircraft seen from above, for which different envelopes, called warning envelopes, have been depicted.

This system 1 (fitted on board the aircraft AC, as shown highly schematically in FIG. 2 and FIG. 4) is designed to assist the aircraft AC, notably when it taxiis on a pathway of an aerodrome 2, as in the example of FIG. 2.

In the context of the present invention, a pathway of an aerodrome 2, as shown in FIG. 2, is:
- either a runway 3, 4 for the takeoff and/or landing of aircraft;
- or a taxiway 5, 6 which enables an aircraft to travel on the aerodrome 2, notably for making the trip (by taxiing on the ground) between a runway 3, 4 used for takeoff or landing and a parking area (not shown).

In the example of FIG. 2, the aircraft AC is taxiing along the taxiway 5 toward the runway 3. The taxiway 5 is provided with a center line C1 (or central axis), colored yellow for example, and is delimited laterally, on either side, by double path edge lines C3 and C4, also colored yellow for example. FIG. 2 also shows a center line C2 of the taxiway 6 and a center line C9 of the runway 3.

The system 1 is designed to assist the aircraft AC to avoid an excursion from the pathway used. The system 1 considers that the aircraft AC is at risk of an excursion if its trajectory approaches too closely to an edge line (such as the lines C3 or C4, for example) or departs too far from a center line (such as the line C1, for example). Such an excursion (apart from being problematic and dangerous in general for the taxiing of the aircraft) would expose the aircraft to risks of collision, notably with other aircraft, vehicles, ground equipment or airport infrastructure, and/or could cause damage to the aircraft and/or interference with the operation being performed by the aircraft.

For determining an excursion, if the departure of the aircraft from the center line is taken into account, it is necessary to know the width of the pathway used in order to be able to determine whether, because of this departure from the center line, the aircraft is approaching one of the edge lines too closely.

Figure 5:
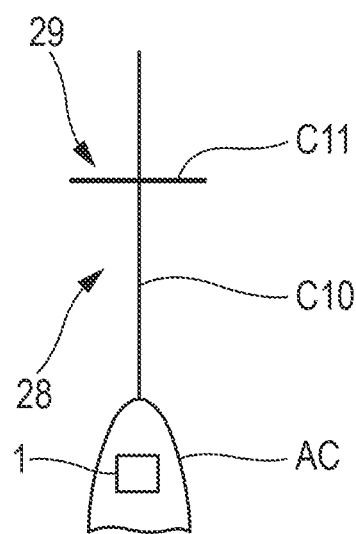
FIG. 5 is a schematic view of an aircraft seen partially from above, in a parking phase.

The system 1 is active on the aircraft AC:
- during a taxiing phase of the aircraft, as in the example of FIG. 2, where an excursion is a departure from the surfaced area (of the runway 3, 4 or the taxiway 5, 6) on which it is taxiing, by a lateral deviation (lateral excursion) or by longitudinally overrunning the area (longitudinal excursion); and/or
- during a parking phase of the aircraft AC, where an excursion is an excessive departure from a normal center line (or central axis) of a parking lane or area, or from a stop marking which is a customary ground marking at which an element of the aircraft, for example its front landing gear, must be positioned when the aircraft is in a (final) parked position, as specified below with reference to FIG. 5.

The system 1 is not active and is not intended to detect an excursion from a pathway during the other flight phases (takeoff or landing, for example).

Said system 1 comprises, as shown in FIG. 1:

a monitoring unit 7, configured:

for monitoring the aerodrome 2 so that it can detect, particularly by means of optical detection (and notably visual detection), at least one characteristic element Cn (where n is an integer) of a pathway 3, 4, 5, 6 of the aerodrome 2;

for determining a current relative position of at least one landing gear 8, 9, 10 (FIGS. 2 and 4) of the aircraft AC with respect to the characteristic element Cn thus detected; and for detecting a future excursion from said pathway of the aerodrome 2 by the aircraft AC on the basis, notably, of this determined current relative position and parameters (notably the speed) of the aircraft; and at least one avoidance assistance unit 11, configured for implementing at least one action for assisting the avoidance (that is to say, the prevention) of said future excursion, if a future excursion is detected by the monitoring unit 7 (to which the assistance unit is connected by a link 12), as specified above.

In FIG. 4, the location of the front landing gear 8 (not directly visible in this plan view (from above) of the aircraft AC taxiing on the ground) is shown schematically by a cross. Also, the main left and right landing gears 9 and 10 are visible in FIG. 2, which is a perspective view of the aerodrome 2.

Additionally, said characteristic element or elements Cn that can be detected by the monitoring unit 7 comprise one of the following elements:

a center line of the pathway, such as the center line C1 of the taxiway 5, the center line C9 of the runway 3 and the center line C2 of the pathway taxiway 6, as shown in FIG. 2;

an edge line of the pathway, such as the edge lines C3 and C4 of the pathway 5 of FIG. 2. Such an edge line may not be present on some pathways;

a boundary between an area (such as the taxiways 5 and 6) surfaced for traffic on the pathway and an area (such as areas Z1 and Z2 in FIG. 2) not surfaced for traffic, such as the boundaries C5 and C6 of the taxiway 5 and the boundaries C7 and C8 of the taxiway 6;

a center line on a pathway leading to a parking position, such as a center line C10 on a pathway 28 leading to a parking position 29 shown highly schematically in FIG. 5;

a stop marking (such as a stop marking C11 shown in FIG. 5), representing a normal ground marking, in the form of a segment of straight line for example, where a part of the aircraft, for example its front landing gear, is to be positioned when the aircraft is in the parking position (such as the parking position denoted by the reference 29 in FIG. 5).

More precisely, in order to avoid an excursion, the aforesaid characteristic elements are taken into consideration, these elements being, for the particular examples of FIGS. 2 and 5:

for the taxiing phase (FIG. 2), the trajectory (that is to say, a sequence of successive current positions) of the aircraft AC relative to:

the boundary C5 to C8 between the area (taxiways 5 and 6) surfaced for traffic on the pathway and the area Z1, Z2 not surfaced for traffic;

the center line C1, C2 of the taxiway 5, 6 and the edge lines (if present), during taxiing on a taxiway 5, 6; and the center line C9 of the runway 3 and the edge lines C3 and C4, during taxiing on a runway 3; and for the parking phase (FIG. 5), the trajectory of the aircraft AC relative to:

the center line C10 of the pathway 28 leading to the parking position 29; and the stop marking C11 at the parking position 29.

Additionally, the monitoring unit 7 comprises an optical detection system 13, preferably a visual detection system.

This optical detection system 13 comprises, as shown in FIG. 1:

an imaging device 14 (IMAG) configured for capturing images of the external environment of the aircraft AC; and an image processing device 15 (PROCESS1) configured for processing at least some of the images captured by the imaging device 14, so as to detect a characteristic element Cn (specified below), if present, when this characteristic element Cn is shown in at least one of the processed images (that is to say, when a representation of the element is found in the image).

Preferably, the imaging device 14 captures images in the visible domain, and the system 13 is then a visual detection system. In a variant, it may also capture images from radiation at other wavelengths, in the infrared for example.

Additionally, the image processing device 15 uses at least one of the following techniques, as specified below:

a technique using artificial intelligence;

an image processing technique.

Additionally, the monitoring unit 9 also comprises a data processing device 16 (PROCESS2) configured for performing different processes and calculations specified below. The data processing device 16 is connected via a link 17 to the optical detection system 13.

In a specific embodiment, the data processing device 16 is configured for determining the relative position between a characteristic element, the representation of which has been detected in the image, and the corresponding landing gear of the aircraft, with allowance for the characteristics (position, orientation, calibration) of the imaging device 14.

Additionally, in a preferred embodiment, the monitoring unit 7 comprises a radar 18 connected via a link 19 to the data processing device 16 and configured for detecting a boundary between an area surfaced for traffic and an area without such surfacing. In the preferred embodiment, the monitoring unit 7 thus simply uses a radar 18 to detect the edge of the pathway (on the basis of the detection of a difference in material on the ground) in order to determine the position of the aircraft relative to this edge of the pathway used by said aircraft.

Additionally, in a particular embodiment, the monitoring unit 7 also comprises a set 20 of data sources S1, . . . , Si (DATA1, . . . , DATAi), where i is an integer. This set 20 comprises at least one of the following customary data sources S1 to Si, fitted in the aircraft AC:

an inertial reference system;

a satellite positioning system;

an odometer;

a tachometer;

an optoelectronic sensor.

Additionally, in this particular embodiment, the data processing device 16 (which is connected via a link 21 to the set 20) is configured for determining what is called the absolute position of the aircraft, using data obtained from at least one of said data sources S1 to Si.

In a particular embodiment, the data processing device 16 determines a consolidated relative position, using various items of position data (regarding relative position(s) and/or absolute position(s)) received from the data sources.

Additionally, in a particular embodiment, the data processing device 14 is configured, as specified below:

for determining at least one current warning envelope, representative of what is called an excursion time, and depending at least on said current relative position of a landing gear of the aircraft AC and on parameters of the aircraft; and for detecting an excursion from a pathway if the current warning envelope touches an edge of the pathway being followed.

The unit for assisting avoidance 11 also comprises a message emitting device (MESSAG) 24. The message emitting device 24 is configured for emitting to the flight deck of the aircraft AC, for delivery to the pilot or pilots of the aircraft AC, at least one of the following messages: a warning message and a ground navigation aid message. The message emitting device 24 emits the message or messages in visual form and/or in audible form and/or in any other form, for example by mechanical stimulation in the pilot's seat.

Additionally, the unit for assisting avoidance 11 also comprises a braking device (BRAK) 25, configured for automatically generating the braking of the aircraft AC if the pilot takes no appropriate action after the emission of a warning message by the message emitting device 24.

Thus, as described in greater detail below, the system 1 is capable, during the taxiing and/or parking phase, on the one hand, of detecting (by optical detection) a future excursion (longitudinal or lateral), that is to say a potential excursion, from a pathway of an aerodrome by the aircraft in which said method is implemented, and, on the other hand, of providing assistance to the pilot to avoid the excursion in such a situation, particularly, as also specified below, by improving the pilot's awareness of the actual situation (using warning messages or ground navigation aid messages emitted by the message emitting device 24) and/or by providing protection or safety as a last resort or a final recourse (by automatic braking implemented by the braking device 25), notably in case of error or incapacity of the pilot.

Figure 3:
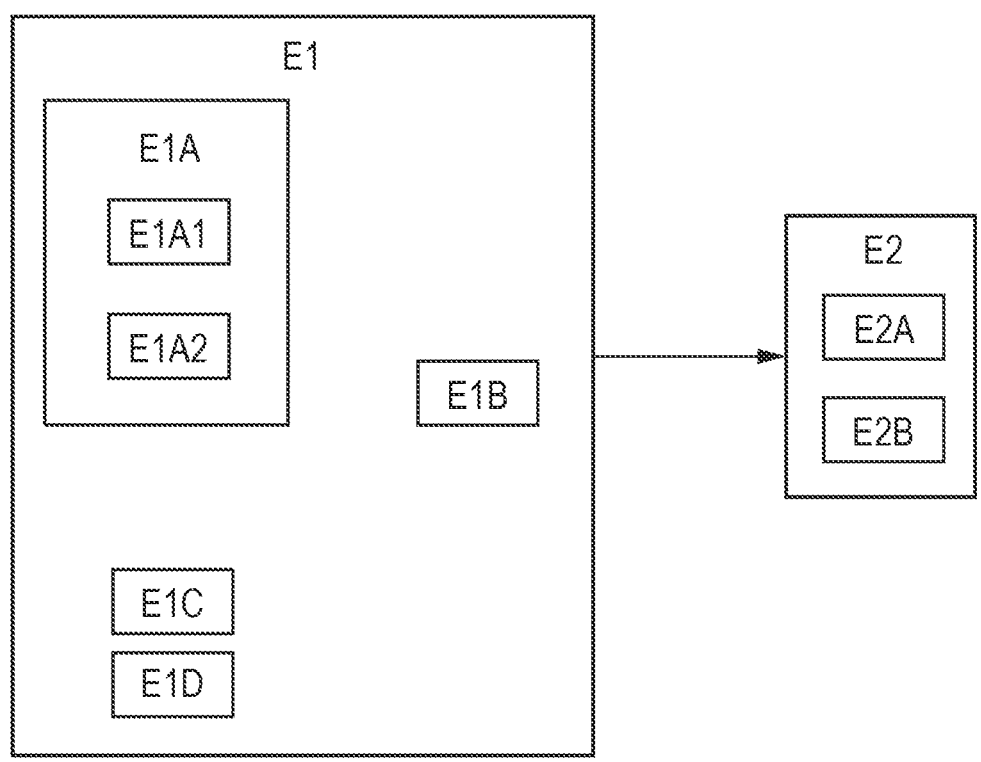
FIG. 3 shows schematically the main steps of a method for assisting the avoidance of an excursion from a pathway, according to a particular embodiment of the invention.

The system 1, as described above, is designed to implement a method P of assistance in the avoidance of an excursion (longitudinal or lateral) from a pathway 5 of an aerodrome 2 by an aircraft AC taxiing on the pathway 5, as described below with reference to FIG. 3.

Said method P comprises the following steps:

a monitoring step E1, implemented by the monitoring unit 7, at least for the purpose of monitoring the aerodrome 2 (FIG. 2) so as to be able to detect, particularly by means of optical detection, at least one characteristic element of a given pathway, in order to determine a current relative position of at least one landing gear 8, 9, 10 of the aircraft AC with respect to the characteristic element C1 to C9 detected, and to detect a future excursion from said pathway of the aerodrome 2 by the aircraft AC on the basis, at least, of this current relative position; and a step of assisting avoidance E2, implemented by the unit for assisting avoidance 11, so that, at least, if a future excursion is detected in the monitoring step E1, at least one action for assisting the avoidance of said future excursion is implemented.

The monitoring step E1 is implemented continuously when the system 1 is active and the method P is implemented, and for as long as this continues to be the case.

Regarding the step of assisting avoidance E2, this is implemented only when a future excursion has been deduced in the monitoring step E1.

The system 1 is activated and the method P is implemented as soon as (and only when) the aircraft AC is in a taxiing phase or in a parking phase.

This activation (of the system 1 for implementing the method P) is carried out automatically, the system 1 automatically and routinely being aware of the implementation of a taxiing phase or a parking phase. The system 1 is inactivated at the end of the taxiing phase and/or the parking phase. This inactivation is carried out automatically, or manually by the pilot, by actuating an inactivation element (not shown) of the system 1.

In a preferred embodiment, the monitoring step E1 comprises an optical detection step E1A. This optical detection step E1A comprises:

an image capture sub-step E1A1, implemented by the imaging device 14, for capturing images from the external environment of the aircraft AC; and a sub-step E1A2 of image processing, implemented by the image processing device 15, for processing at least some of the images captured in said image capture sub-step E1A1, so as to detect, if appropriate, a characteristic element Cn, when this characteristic element is represented on one of the processed images.

The optical detection step E1A is implemented to detect all the (visual) characteristic elements that can be taken into account for the implementation of the monitoring step E1, in any of these circumstances:

during the taxiing phase, with the characteristic elements (such as the aforesaid characteristic elements C1 to C9) taken into account in this taxiing phase; or during the parking phase, with the characteristic elements (such as the aforesaid characteristic elements C10 and C11) taken into account in this parking phase.

In order to implement this optical detection, the aircraft AC is equipped with one or more imaging devices 14, namely, preferably, cameras, for taking (or capturing) images from the external environment (in the image capture sub-step E1A1) during the taxiing of the aircraft AC, and for supplying the captured images to the image processing device 15.

The cameras may be arranged at various locations on the aircraft AC, where they capture the scene in front of the aircraft AC with a sufficient field of view to detect the characteristic elements Cn, regardless of the trajectory of the aircraft AC.

Preferably, the most appropriate locations are the belly fairing (not visible in the figures) of the aircraft AC, the nose 26 (FIG. 2) of the aircraft AC, and the sides of the fuselage of the aircraft AC.

In a first variant embodiment, the image processing sub-step E1A2 employs a technique using artificial intelligence.

In this first variant, one or more artificial intelligence algorithms integrated into the image processing device 15 use an image as an input, and where appropriate detect and locate a representation of the characteristic element in the image. Various artificial intelligence procedures may be used, including machine learning and/or deep learning techniques.

In a preferred embodiment, in which the image processing device 15 is based on artificial intelligence using a machine learning system, the machine learning system uses for its learning previously collected data representative of various situations conforming to those that may be encountered by an aircraft traveling on an aerodrome. For this purpose, cameras are installed on one or more aircraft. These cameras are identical to those used by the system 1, or at least have technical characteristics similar to choose used by the system 1. These cameras are installed on the one or more aircraft in the same locations as, or in locations as close as possible to, those of the cameras of the system 1. Images are captured during the taxiing of the one or more aircraft, equipped in this way, on the acrodromes, and the captured images are stored. The set of stored images is then collected. The image captures are performed on different aerodromes, in different and varied lighting conditions (in daytime, at night, etc.) and in different and varied weather conditions (in sunshine, rain, snow, etc.), so as to take into account all the main situations and conditions that may be encountered by an aircraft equipped with the system 1. The set of images thus collected is used by the artificial intelligence learning system of the image processing device 15.

Various processing techniques based on artificial intelligence may provide the desired information. The following may be mentioned by way of illustration:
  Object detection. In this case, if a characteristic element is represented in the image, the artificial intelligence algorithm detects it and locates it spatially in the image. These operations may be performed by taking into account, notably, the geometry, the color, the symmetry, etc., with ordinary automatic learning algorithms, or may be implemented in full by a deep learning algorithm that has been pre-trained to find the best characteristics for detecting objects;
  Image segmentation. In this case, each pixel of the image is classed as forming part, or not forming part, of a characteristic element, and if a characteristic element is represented in the image, all the pixels relating to this characteristic element may be used to detect and locate it.

In a second variant embodiment, the image processing sub-step E1A2 employs an image processing technique.

It is known that image processing techniques process the pixels of an image, using ordinary filters and techniques for processing the signal, for the purpose of retrieving the points of interest and the geometrical information from the image, in order to check whether a characteristic element is represented in the image, and, where appropriate, in order to locate it spatially in the image.

When the position of the representation of the characteristic element Cn in the image is known (as a result of the image processing implemented in the image processing sub-step E1A2), and taking into account the calibration characteristics of the imaging device 14, notably a camera, used for capturing the processed image, the system 1 and, for example, the data processing device 16, are able to determine, in the usual manner, in a data processing step E1B, the current relative position of a landing gear 8, 9, 10 of the aircraft AC relative to the detected characteristic element. By way of calibration characteristics of the imaging device 21, the system 1 uses, in particular, the position and orientation of the imaging device 14 on the aircraft (notably relative to the landing gear in question) together with the image capture parameters (aperture, resolution, etc.) of the imaging device 14.

Additionally, in a third variant embodiment, the image processing sub-step E1A2 implements simultaneously a technique (such as that described above) using artificial intelligence and an image processing technique (such as that which is also described above).

At each instant of image capture considered, the camera or cameras capture a new image, which is subsequently processed. Thus a trajectory of the aircraft is found by taking into account the successive positions of the aircraft relative to the characteristic element.

The monitoring step E1 also comprises the data processing step E1B implemented by the data processing device 16.

In a preferred embodiment, the monitoring step E1 also comprises a detection step EC consisting in detecting, using the radar 18, a boundary C5, C6 (FIG. 2) between an area surfaced for traffic of the pathway used (for example the taxiway 5 in the example of FIG. 2) and an area Z1, Z2 not surfaced for traffic, and determining the relative position of this boundary C5, C6 with respect to the aircraft AC, and notably with respect to a landing gear 8, 9, 10 of the aircraft AC. This information about the relative position is received (via the link 19) and is used by the data processing device 16, in the data processing step E1B, to determine the current relative position of the aircraft. This information about the relative position may also be used by the data processing device 16, in the data processing step E1B, in addition to the information obtained by optical detection, to generate a consolidated current relative position, thereby increasing the accuracy of the consolidated current relative position.

Additionally, in a particular embodiment, the monitoring step E1 comprises a measurement step E1D, implemented by one or more of the information sources of the set 20, consisting in measuring information for determining what is called the absolute position of the aircraft AC (that is to say a clearly defined position on the aerodrome 2 as such). Additionally, in this particular embodiment, the data processing step E1B determines the absolute position of the aircraft AC using measurements made in the measurement step E1C.

Also, in a preferred embodiment, the data processing step E1B determines a consolidated relative position of a landing gear 8, 9, 10 of the aircraft AC, using different pieces of information on position, concerning the relative positions and/or the absolute positions, that were obtained in the manner described above. Such a consolidated current relative position (used for detecting an excursion) is particularly accurate.

The data processing step E1B, implemented by the data processing device 16, also consists in:
  determining at least one current warning envelope A1, A2, A3 (FIG. 4) specified below, depending at least on a relative position of a particular landing gear 8, 9, 10 of the aircraft AC and on parameters of the aircraft AC; and
  detecting an excursion from a pathway if the current warning envelope A1, A2, A3 touches an edge of the pathway being followed.

The data processing step E1B assumes that the aircraft AC is in danger of an excursion if its trajectory is predicted to depart from the surfaced area without returning to it.

The calculation of the boundaries may include supplementary margins. This is because, in particular cases of use, such as corners or half-circles, one wheel of a landing gear 8, 9, 10 of the aircraft may happen to travel temporarily on an unsurfaced area.

The data processing step E1B determines, for each of the landing gears 8, 9, 10 of the aircraft AC, at least one current warning envelope, and preferably a plurality of different current warning envelopes, each of which depends on a duration called the particular excursion duration.

In a particular embodiment, three levels of warning are provided, namely, in the order of triggering of the warning in the event of an excursion from the pathway:
- an advisory, which is optional;
- a caution; and
- a warning.

A warning (or safety) enveloped A1, A2, A3 is determined for each of the warning levels considered. More precisely, in the aforesaid particular embodiment, as shown in FIG. 4:
- the warning envelope A1 is determined for an advisory;
- the warning envelope A2 is determined for a caution;
- the warning envelope A3 is determined for a warning.

In a preferred embodiment, shown in FIG. 4, a set 27 of warning envelopes A1, A2, A3, associated with the front landing gear 8 of the aircraft AC, is shown. Each warning envelope A1, A2, A3 corresponds to a half-circle projected onto the ground, in front of the aircraft AC. Each warning envelope A1, A2, A3 is centered on the front landing gear 8 of the aircraft AC, and has a particular radius R1, R2, R3. This radius R1, R2, R3 represents the relative distance between the front landing gear 8 of the aircraft AC and a characteristic element Cn, on the basis of which the corresponding warning will be triggered. Preferably, the system 1 also determines and also uses a set of warning envelopes (not shown) for each of the main landing gears 9 and 10 of the aircraft AC.

The radius R1, R2, R3 is calculated as a function of what is called an excursion time. The excursion time is a predetermined time. It is the period allowed for the aircraft AC to reach the characteristic element Cn before the corresponding warning is triggered. It varies on the basis of the warning level. More precisely, as the warning level rises (in other words, when a danger becomes more imminent), the excursion time decreases, as shown in FIG. 4 for the corresponding radii R1, R2 and R3. By way of non-limiting illustration, it may, for example, be 3 or 4 seconds for radius R3, 5 or 6 seconds for radius R2, and 8 to 10 seconds for radius R1.

Radius R3 is calculated (by the data processing device 16) on the basis of the corresponding predetermined excursion time, taking into account the following parameters, comprising parameters of the aircraft AC:
- the relative position of the landing gear 8, 9, 10 of the aircraft AC;
- parameters (speed, braking capacity) of the aircraft AC; and
- a deceleration command, if any, generated on the aircraft AC.

Regarding the radii R2 and R1, these are calculated on the basis of the radius R3, taking into account on each occasion a corresponding predetermined pilot reaction and decision time.

Finally, the step E2 of assisting avoidance, implemented by the avoidance aid unit 11, performs (if a future excursion is detected in the checking step E1) at least one action for assisting the avoidance (that is to say, the prevention) of this future excursion.

For this purpose, the step of avoidance assistance E2 usually comprises, in the first place, a sub-step E2A of emitting one or more messages to the pilot on the flight deck of the aircraft AC. The message or messages may be one or more warning messages (simply warning the pilot of the situation) and/or one or more ground navigation aid messages (giving information or instructions to the pilot to counteract the risk of excursion, for example by asking the pilot to brake the aircraft AC).

The message emitting device 24 emits the following message or messages:
- in visual form, for example by displaying a message or a sign on a screen on the flight deck, notably via a normal "head up" display, or by emitting a light signal; and/or
- in audible form, for example by using a loudspeaker and/or a siren installed on the flight deck.

Each warning message emitted depends on the warning level considered, from among the possible warning levels, and notably from among the three warning levels described above. By way of illustration, the message emitting device 24 may emit the following messages for these three warning levels:
- for an advisory: a visual message;
- for a caution: visual and audible messages; and
- for a warning: visual and audible messages. If necessary, a sub-step E2B of automatic braking is also triggered.

This sub-step E2B executes the automatic braking of the aircraft, which is implemented by the braking device 25. For this purpose, in a particular embodiment, the braking device 25 automatically sends a braking command to an ordinary braking system of the aircraft AC, preferably until the aircraft AC comes to a complete halt.

Thus, if the pilot fails to take the appropriate measures after the advisory, caution and warning, the system 1 triggers a recovery action; that is to say, an appropriate automatic braking command is calculated and supplied to the braking system of the aircraft AC to halt it and thus to prevent an excursion (longitudinal or lateral) from the pathway being followed.

Thus this sub-step E2B automatically generates the braking of the aircraft if there is no appropriate action by the pilot after the messages have been emitted. This sub-step E2B implements protection of last resort and makes it possible, notably, to avoid the possible consequences of any error or incapacity of the pilot.

In a particular case, if the necessary conditions are met, this sub-step E2B may be implemented even if the sub-step E2A has not been implemented beforehand.

The system 1 and the method P as described above have numerous advantages. In particular:
- they can automatically detect a future excursion (or potential excursion) from a pathway followed by the aircraft AC equipped with the system 1;
- they can provide assistance to the pilot of the aircraft for the purpose of avoiding the excursion in such a situation;
- this assistance consists, in the first place, in making the pilot aware of the current situation by means of one or more warning and/or ground navigation aid messages;
- this assistance, notably, enables the pilot to be provided with a relevant warning level based on the excursion time;
- this assistance also comprises protection of last resort or final recourse (using automatic braking), particularly for the purpose of remedying an error or incapacity of the pilot; and
- the processes used, notably where the optical detection is concerned, may use artificial intelligence techniques, and are particularly accurate.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assisting the avoidance of an excursion from a pathway of an aerodrome by an aircraft taxiing on the pathway, said method comprising:
   a monitoring step (E1), implemented by a monitoring unit, at least for the purpose of monitoring the aerodrome so as to allow the detection of at least one characteristic element of a pathway, for determining a current relative position of at least one landing gear of the aircraft (AC) with respect to the detected characteristic element, and for detecting a future excursion from said pathway of the aerodrome by the aircraft (AC) on the basis of, at least, the current relative position and parameters of the aircraft (AC), said characteristic element or elements comprising at least one boundary between an area surfaced for traffic on a pathway and an area not surfaced for traffic, the monitoring step (E1) using a radar for detecting the boundary between the area surfaced for traffic on a pathway and the area not surfaced for traffic; and
   a step of assisting avoidance (E2), implemented by at least one unit for assisting avoidance, so that, at least, if a future excursion is detected in the monitoring step (E1), at least one action for assisting the avoidance of said future excursion is implemented.

2. The method as claimed in claim 1,
wherein the monitoring step (E1) implements optical detection and comprises, for the implementation of the optical detection:
   an image capture sub-step (E1A1), implemented by the imaging device, for capturing images from the external environment of the aircraft (AC); and
   a sub-step (E1A2) of processing at least some of the images captured in said image capture sub-step (E1A1), so as to detect, if appropriate, at least one of the at least one characteristic element of a pathway when the at least one characteristic element is represented on at least one of the processed images.

3. The method as claimed in claim 2,
wherein the image processing sub-step (E1A2) implements at least one of the following techniques:
   a technique using artificial intelligence; or
   an image processing technique.

4. The method as claimed in any of claim 2,
wherein the monitoring step (E1) comprises a data processing sub-step (E1B), implemented for the purpose, at least, of determining the current relative position between the one of the at least one characteristic element, the representation of which has been detected in the image, and the landing gear of the aircraft (AC), with allowance for the characteristics of the imaging device used in the image capture sub-step (E1A).

5. The method as claimed in claim 1,
wherein said characteristic element or elements comprise at least one of the following elements:
   a center line of a pathway;
   an edge line of a pathway; or
   a stop marking.

6. The method as claimed in claim 1,
wherein the monitoring step (E1) determines what is known as an absolute position of the aircraft (AC), using information from at least one of the following elements of the aircraft (AC): an inertial reference system, a satellite positioning system, an odometer, a tachometer, and an optoelectronic sensor.

7. The method as claimed in claim 1,
wherein the monitoring step (E1) determines a consolidated current relative position of a landing gear of the aircraft (AC), using at least two pieces of position information.

8. The method as claimed in claim 1,
wherein the monitoring step (E1) comprises a data processing step (E1B) implemented at least in order to determine at least one current warning envelope (A1, A2, A3), corresponding to what is known as an excursion time, and depending at least on said current relative position of the landing gear of the aircraft (AC) and on said parameters of the aircraft (AC), and to detect an excursion from a parameter if the warning envelope touches an edge of the pathway.

9. The method as claimed in claim 8,
wherein the data processing step (E1B) determines, for each of the landing gears of the aircraft (AC), a plurality of different current warning envelopes, each of which depends on a particular excursion duration.

10. The method as claimed in claim 1,
wherein the avoidance assistance step (E2) is implemented at least for the purpose of emitting at least one of the following messages: a warning message or a ground navigation aid message, said message being emitted in at least one of the following forms: visual or audible.

11. The method as claimed in claim 1,
wherein the avoidance assistance step (E2) is implemented at least for the purpose of automatically generating the braking of the aircraft (AC), at least if there is no appropriate action by the pilot after the emission of at least one message.

12. A system for assisting the avoidance of an excursion from a pathway of an aerodrome by an aircraft taxiing on the pathway, said system comprising:
   a monitoring unit, configured for monitoring the aerodrome so as to allow the detection, by at least one optical detection, of at least one characteristic element of a pathway, for determining a current relative position of at least one landing gear of the aircraft (AC) with respect to the detected characteristic element, and for detecting a future excursion from said pathway of the aerodrome by the aircraft (AC) on the basis of, at least, the current relative position and parameters of the aircraft (AC), said characteristic element or elements comprising at least one boundary between an area surfaced for traffic on a pathway or an area not surfaced for traffic, the monitoring unit comprising a radar for detecting the boundary between the area surfaced for traffic on the pathway and the area not surfaced for traffic; and at least one avoidance assistance unit, configured for implementing, if a future excursion is detected by the monitoring unit, at least one action for assisting the avoidance (or prevention) of said future excursion.

13. An aircraft, comprising
at least one system as claimed in claim 12.

* * * * *